UNITED STATES PATENT OFFICE 2,343,428

FILTER

Donald H. Wells, Maplewood, N. J., and Melvin De Groote, University City, Mo., assignors to Purolator Products, Inc., Newark, N. J., a corporation of Delaware No Drawing. Application February 28, 1941, Serial No. 381,119

16 Claims. (Cl. 252—326)

This invention relates to filtration and filters therefor and relates more particularly to filtration of lubricating oil of an internal combustion engine for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oil of internal combustion engines the dirt removal rate of a filtering medium may be sharply increased by contacting oil in the lubricating system of the engine that is filtered by the filtering medium with a product of esterification reaction between a drastically oxidized fatty body containing an ester forming group and a polyhydric alcohol, the fatty body being selected from the group consisting of unsaturated non-drying and semi-drying vegetable and animal substances, and the ester product containing a hydroxyl group in the polyhydric alcohol residue. The ester product may be added to the filtering medium in order to increase the dirt removal rate of the filtering medium or may be contacted in some other way with the oil in the system that passes through the filtering medium. Preferably the ester product is used according to this invention by including it in a filter for use in the lubricating system of an internal combustion engine so as to provide an improved filter having a high dirt removal rate.

The drastically oxidized fatty body can be produced by subjecting an unsaturated non-drying or semi-drying vegetable or animal fatty oil or acid to conditions such that the fatty body becomes drastically oxidized. This is usually accomplished by subjecting the fatty body to blowing or other oxidizing conditions adapted to effect drastic oxidation.

The non-drying and semi-drying unsaturated fatty oils which may be drastically oxidized and partially esterified to produce an esterification product suitable for use in increasing the dirt removal rate of filtering media according to this invention may be exemplified by castor oil, soya bean oil, rapeseed oil, cottonseed oil, sunflower seed oil, corn oil, neat's foot oil and the like. These oils are to be distinguished from the drying oils such as linseed oil, tung oil, oiticica oil, poppyseed oil, perilla oil, and from the saturated non-drying oils and fats such as stearine.

Vegetable and animal fatty unsaturated oils may be produced in a drastically oxidized condition by means of treatment such as blowing with a suitable gaseous oxidizing medium, e. g. air, oxygen, ozone, or ozonized air. Such oxidation is commonly carried out at ordinary or superatmospheric pressure (up to about 200 pounds per sq. inch), either moist or dry, and in the presence or absence of a catalyst such as lead oleate, cobalt ricinoleate or manganese linoleate or such as alpha pinene or linseed oil, etc. Care should be taken, however, not to permit temperature rise such that excessive pyrolytic decomposition would take place. The oxidation may be vigorous as by violent blowing or may be more gradual as by exposure in thin films to air provided the oxidation is sufficiently prolonged to obtain the desired condition of drastic oxidation. Usually the time required to oxidize the oil is at least about 8 to 10 hours under conditions most favorable to rapid oxidation of the oil, e. g. blowing at relatively high temperature, and for certain fatty bodies much more prolonged oxidation e. g. several days or even weeks is desirable especially under conditions less favorable to rapid oxidation. In any event whether the oxidation is produced by long continued mild oxidation or by more vigorous oxidation, a condition of drastic oxidation is indicated by changes in the chemical and physical attributes of the oil. These changes are usually indicated by a lowered iodine value, an increased saponification value, an increased specific gravity, usually an increased acetyl value, and an increased refraction index.

In referring to esterification with a "polyhydric alcohol" reference is made to aliphatic alcohols containing two or more hydroxyl groups. Examples of polyhydric alcohols are glycerol, ethylene glycol, beta-methyl glycerol, 1,3 propanediol pentamethylene glycol, alpha, beta, gamma pentantriol, sorbitol, mannitol, and the like. Polyhydroxy ether alcohols may also be used such as diglycerol, triglycerol, diethylene glycol, etc., and such as produced by ether formation between two or more polyhydric alcohols, e. g. monoglyceryl ether, 1,3 propanediol monoethylene glycol ether, diethylene glycol monoglyceryl ether, etc. Polyhydroxy ether alcohols may also be produced from a polyhydric alcohol containing three or more hydroxyls and a monohydric alcohol, examples of such compounds being glycerol monobutyl ether, glycerol monoalkyl ether, pentanediol monoethyl ether, diglycerol monopropyl ether, etc. An aralkyl polyhydric alcohol such as phenyl glycerol may be used.

Preferably in preparing ester products for use in increasing the dirt removal rate of a filtering medium, a drastically oxidized non-drying or semi-drying unsaturated animal or vegetable fatty oil is directly re-esterified with a polyhydric alcohol, so as to produce a superglycerinated drastically oxidized oil containing a free hydroxyl in the alcohol residue. This can be readily accomplished by heating the polyhydric alcohol and oxidized fatty oil at a temperature above 100° C. for a period of several hours. While a catalyst need not necessarily be employed, the reaction can be facilitated by the use of some catalyst such as sodium carbonate, sodium ricinoleate, or potassium hydroxide.

While it is preferred to directly re-esterify an oxidized oil, a suitable esterification product may be made by reacting with a polyhydric alcohol a highly oxidized unsaturated fatty acid derived from a non-drying or semi-drying oil to yield a partial ester containing a hydroxyl group in the alcohol residue. Examples of such fatty acids are castor oil fatty acids, soya bean oil fatty acid, oleic acid, etc. Such acids may be highly oxidized in the manner mentioned above in connection with fatty oils, e. g. by blowing.

When a fatty oil or acid is reacted with a polyhydric alcohol to produce a drastically oxidized superglycerinated oil or fat which contains more than one hydroxyl group in the alcohol residue, such residual hydroxyls may be reacted with an aliphatic monocarboxy acid containing less than 8 carbon atoms, but at least one free hydroxyl group should be retained in the alcohol residue of the ester product.

As an example of a preferred ester product which may be used to increase the dirt removal rate of a filtering medium, reference is made to the ester product obtained by re-esterification of drastically oxidized castor oil with glycerol. This product may be obtained by heating at temperature of about 200–250° C. for about 5 hours about 1 part of commercial glycerine with about 5 parts of drastically oxidized castor oil, constant stirring is employed and the final product should be a homogeneous mass. For preferred results the castor oil should be pale blown castor oil oxidized until it has the following characteristics:

Acid number_____ 15.1 to 25.0
Saponification number_____ 230.5 to 274.0
Iodine number_____ 43.5 to 55.0
Acetyl number_____ 164.0 to 192.0
Hydroxyl number_____ 188.0 to 220.0
Percent unsaponifiable matter_____ 1.1
Percent nitrogen_____ .0
Percent $SO_2$_____ .0
Percent ash_____ Trace The ester product produced as above described is a viscous oily appearing material of pale amber color which is soluble in such solvents as various alcohols, some ketones, and esters.

In addition to highly oxidized castor oil other highly oxidized ricinoleic bodies, such as castor oil fatty acid, ricinolein, etc. may be used for partial esterification with a polyhydric alcohol, e. g. glycerol or other glycerol body such as a polyglycerol.

The esterification product produced as above described when used in conjunction with a filter in a filtering operation sharply increases the dirt removal rate of the filter. The product may be used in a number of different ways. Thus in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in the filter or filter medium in other ways than those above mentioned. Moreover whenever the product is permitted to contact oil that passes through a filtering medium it is effective to increase the rate of dirt removal by the filtering medium. Thus if the product is applied to a screen or the like through or past which the oil flows before reaching the filtering medium the dirt removal rate of the filtering medium is increased. If the product is merely introduced into the casing within which the filtering medium is contained it is effective.

The amount of the product that is used depends upon the increase in dirt removal rate that is desired. Ordinarily for commercial purposes a small amount such as about 2 to 25 grams is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned the use of an additive of the type above defined sharply increases the dirt removal rate. In other words, when a filtering operation is carried on using these additives in connecton with a filter, a single filter can be made which can remove dirt as fast as the dirt could be removed by the use of a plurality of untreated filters. In thus increasing the dirt removal rate the improved result is secured chiefly through a greater removal of solids in a single pass through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per sq. in. pressure into a standard type automobile filter and the filtered oil was returned to the tank. Starting with clean oil, 5 grams of solids of the type found in automobiles were added to the oil in the tank in such manner as to be thoroughly distributed throughout the oil in the tank and observation was made of this oil to determine the number of minutes required to clean it to .02% solid content after each addition of the dirt. At two hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described it was found that the treated filter cleaned up the first addition of dirt much more rapidly than the untreated filter and with subsequent dirt additions, the advantage in favor of the treated filter persisted. The life of the treated filter was not materially greater than that of the untreated filter.

According to this invention additives that sharply increase the dirt removal rate of filtering media are made available which retain their effectiveness for the full life of the filter, withstand the temperatures encountered in internal combustion engine lubrication without volatilization, remains absorbed or deposited on the filtering medium during its use and impart no injurious effects to the oil being filtered. The additive may be used without requiring any material change in the manufacture of the filter. Because of the faster dirt removal rate resulting from the use of the additive, the filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising a product of esterification reaction between a drastically oxidized fatty body containing an ester forming group and a polyhydric alcohol, said fatty body being selected from the group consisting of unsaturated non-drying and semi-drying vegetable and animal fatty substances, and said product of esterification containing a hydroxyl group in the polyhydric alcohol residue.

2. A filter according to claim 1 wherein said drastically oxidized fatty body is a drastically oxidized fatty oil.

3. A filter according to claim 1 wherein said polyhydric alcohol is a glycerol body.

4. A filter according to claim 1 wherein said polyhydric alcohol is glycerol.

5. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising a product of esterification reaction between a drastically oxidized ricinoleic body and a polyhydric alcohol, said product containing a free hydroxyl in the alcohol residue.

6. A filter according to claim 5 wherein said ricinoleic body is drastically oxidized castor oil.

7. A filter according to claim 5 wherein said polyhydric alcohol is glycerol.

8. A filter according to claim 5 wherein said polyhydric alcohol is glycerol and said ricinoleic body is castor oil having the following characteristics:

| | |
|---|---|
| Acid number | 15.1 to 25.0 |
| Saponification value | 230.5 to 274.0 |
| Iodine number | 43.5 to 55.0 |
| Acetyl number | 164.0 to 192.0 |
| Hydroxyl number | 188.0 to 220.0 | and substantial freedom from unsaponifiable matter, nitrogen, $SO_2$, and ash.

9. A filter for use in connection with the lubricating system of an internal combustion engine comprising a casing containing a filtering medium sufficiently porous to permit oil to flow therethrough but sufficiently compact to filter out solid particles, said medium having applied thereto as an agent to increase the dirt removal rate of said filtering medium a product of esterification reaction between a drastically oxidized fatty body containing an ester forming group and a polyhydric alcohol, said fatty body being selected from the group consisting of unsaturated non-drying and semi-drying vegetable and animal fatty substances, and said product of esterification containing a hydroxyl group in the polyhydric alcohol residue.

10. A filter according to claim 9 wherein said drastically oxidized fatty body is a drastically oxidized ricinoleic body and said polyhydric alcohol is a glycerol body.

11. A filter according to claim 9 wherein said polyhydric alcohol is glycerol and the drastically oxidized fatty body is drastically oxidized castor oil.

12. A method of increasing the dirt removal rate of a filtering medium arranged in the lubricating system of an internal combustion engine for removing dirt from the lubricating oil in said system, said method comprising contacting oil in the system that is filtered by said filtering medium with a product of esterification reaction between a drastically oxidized fatty body containing an ester forming group and a polyhydric alcohol, said fatty body being selected from the group consisting of unsaturated non-drying and semi-drying vegetable and animal fatty substances, and said product of esterification containing a hydroxyl group in the polyhydric alcohol residue.

13. A method according to claim 12 wherein said drastically oxidized fatty body is a drastically oxidized fatty oil.

14. A method according to claim 12 wherein said drastically oxidized fatty body is a drastically oxidized fatty oil and said polyhydric alcohol is a glycerol body.

15. A method according to claim 12 wherein said drastically oxidized fatty body is drastically oxidized castor oil having approximately the following characteristics:

| | |
|---|---|
| Acid number | 15.1 to 25.0 |
| Saponification value | 230.5 to 274.0 |
| Iodine number | 43.5 to 55.0 |
| Acetyl number | 164.0 to 192.0 |
| Hydroxyl number | 188.0 to 220.0 | and substantial freedom from unsaponifiable matter, nitrogen, $SO_2$, and ash.

16. A method according to claim 12 wherein said polyhydric alcohol is glycerol and said drastically oxidized fatty body is drastically oxidized castor oil.

DONALD H. WELLS.
MELVIN DE GROOTE.